(12) United States Patent
Li et al.

(10) Patent No.: US 10,198,136 B2
(45) Date of Patent: Feb. 5, 2019

(54) OGS TOUCH SCREEN, MANUFACTURING METHOD THEREOF AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Jun Li, Beijing (CN); Wenjie Shi, Beijing (CN); Wenjin Fan, Beijing (CN); Lei Zhang, Beijing (CN); Ming Hu, Beijing (CN); Kefeng Li, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 107 days.

(21) Appl. No.: 15/193,684

(22) Filed: Jun. 27, 2016

(65) Prior Publication Data

US 2017/0192559 A1     Jul. 6, 2017

(30) Foreign Application Priority Data

Jan. 6, 2016 (CN) .......................... 2016 1 0007327

(51) Int. Cl.
    *G06F 3/044* (2006.01)
(52) U.S. Cl.
    CPC .... *G06F 3/044* (2013.01); *G06F 2203/04103* (2013.01)

(58) Field of Classification Search
    CPC ....................................................... G06F 3/044
    See application file for complete search history.

(56) References Cited

U.S. PATENT DOCUMENTS

2011/0242018 A1   10/2011   Kang et al.
2013/0105294 A1    5/2013   Ye et al.
(Continued)

FOREIGN PATENT DOCUMENTS

CN    102270078 A    12/2011
CN    103092384 A     5/2013
(Continued)

OTHER PUBLICATIONS

Office Action dated Jan. 10, 2018 issued in corresponding Chinese Application No. 201610007327.0.

*Primary Examiner* — Nelson Rosario
*Assistant Examiner* — Scott Au
(74) *Attorney, Agent, or Firm* — Nath, Goldberg & Meyer; Joshua B. Goldberg; Daniel Bissing

(57) ABSTRACT

The present invention provides an OGS touch screen, a manufacturing method thereof and a display device. The OGS touch screen comprises a base substrate and a metal bridge provided on the base substrate, wherein at least a region, which corresponds to the metal bridge, of a surface of the base substrate facing the metal bridge is uneven. In the OGS touch screen provided by the present invention, by making at least the region of the surface of the base substrate corresponding to the metal bridge uneven, incident light from a side of the base substrate without the metal bridge can be reflected diffusely at least at the region of the base substrate corresponding to the metal bridge, so that the vanishing effect of the metal bridge is enhanced and the visibility of the metal bridge is reduced.

4 Claims, 1 Drawing Sheet

(56) References Cited

U.S. PATENT DOCUMENTS

| | | | |
|---|---|---|---|
| 2014/0043257 A1* | 2/2014 | Lee | G06F 3/041 |
| | | | 345/173 |
| 2014/0055687 A1* | 2/2014 | Ren | G06F 3/041 |
| | | | 349/12 |
| 2014/0065426 A1* | 3/2014 | Ishihara | B82Y 30/00 |
| | | | 428/408 |
| 2015/0309605 A1* | 10/2015 | Hsu | G06F 3/044 |
| | | | 345/173 |

FOREIGN PATENT DOCUMENTS

| | | |
|---|---|---|
| CN | 103353815 A | 10/2013 |
| CN | 203630756 U | 6/2014 |
| CN | 104714683 A | 6/2015 |
| CN | 104820533 A | 8/2015 |

\* cited by examiner

OGS TOUCH SCREEN, MANUFACTURING METHOD THEREOF AND DISPLAY DEVICE

FIELD OF THE INVENTION

The present invention relates to the field of display technology, and particularly to an OGS touch screen, a manufacturing method thereof and a display device.

BACKGROUND OF THE INVENTION

One Glass Solution (OGS) is a technique of directly forming an ITO (Indium Tin Oxide) conductive film and a sensor on a protection glass, and plays the dual functions of protection and touch sensor. Because the OGS touch screen has the characteristics such as light weight, thinness and good light transmission, the OGS technique has gradually become the leading technique in touch industry.

At present, bridging structures in OGS touch screens may mainly be classified into two types, namely, ITO bridges and metal bridges. Compared with a product using an ITO bridge, a mask process can be saved in manufacturing a product using a metal bridge, and therefore, the manufacturing cost of the product can be effectively reduced. However, for the product using a metal bridge, the metal itself has high glossiness, thus the metal bridge in the product is quite easy to be seen under light, which seriously affects the visual effect of the product appearance.

SUMMARY OF THE INVENTION

In view of the above defect existing in the prior art, a technical problem to be solved by the present invention is to provide an OGS touch screen, in which a metal bridge can have reduced visibility, a manufacturing method thereof and a display device.

To solve the above technical problem, a technical solution of the present invention provides an OGS touch screen, comprising a base substrate and a metal bridge provided on the base substrate, wherein at least a region, which corresponds to the metal bridge, of a surface of the base substrate facing the metal bridge is uneven.

Optionally, the OGS touch screen further comprises a shading layer, a transparent electrode layer, a first cover layer and a second cover layer, and the transparent electrode layer, the first cover layer, the metal bridge and the second cover layer are sequentially provided on one side of the base substrate.

Optionally, the OGS touch screen further comprises a shading layer, a cover layer and a transparent electrode layer, and the metal bridge, the cover layer and the transparent electrode layer are sequentially provided on one side of the base substrate.

Optionally, the base substrate is a glass substrate.

Optionally, only the region, which corresponds to the metal bridge, of the surface of the base substrate facing the metal bridge is uneven.

To solve the above technical problem, the present invention further provides a method of manufacturing an OGS touch screen, comprising steps of:

making a preset region of an upper surface of a base substrate uneven; and forming a metal bridge on the preset region of the upper surface of the base substrate.

Optionally, the base substrate is a glass substrate, and the step of making a preset region of an upper surface of a base substrate uneven includes: making the preset region of the upper surface of the base substrate uneven by an acid corrosion process.

Optionally, before the step of making the preset region of the upper surface of the base substrate uneven by an acid corrosion process, the method of manufacturing an OGS touch screen further comprises a step of attaching an anti-acid film onto a lower surface of the base substrate.

Optionally, the method of manufacturing an OGS touch screen further comprises steps of forming a shading layer, a transparent electrode layer, a first cover layer and a second cover layer on the base substrate, wherein the transparent electrode layer, the first cover layer, the metal bridge and the second cover layer are sequentially formed on one side of the base substrate.

Optionally, the method of manufacturing an OGS touch screen further comprises steps of forming a shading layer, a cover layer and a transparent electrode layer on the base substrate, wherein the metal bridge, the cover layer and the transparent electrode layer are sequentially formed on one side of the base substrate.

Optionally, the preset region of the upper surface of the base substrate is a region of the upper surface of the base substrate corresponding to the metal bridge only.

To solve the above technical problem, the present invention further provides a display device, comprising the above OGS touch screen.

Optionally, the OGS touch screen of the display device further comprises a shading layer, a transparent electrode layer, a first cover layer and a second cover layer, and the transparent electrode layer, the first cover layer, the metal bridge and the second cover layer are sequentially provided on one side of the base substrate.

Optionally, the OGS touch screen of the display device further comprises a shading layer, a cover layer and a transparent electrode layer, and the metal bridge, the cover layer and the transparent electrode layer are sequentially provided on one side of the base substrate.

Optionally, in the OGS touch screen of the display device, the base substrate is a glass substrate.

Optionally, in the OGS touch screen of the display device, only a region, which corresponds to the metal bridge, of a surface of the base substrate facing the metal bridge is uneven.

Beneficial effects are as follows.

In the OGS touch screen provided by the present invention, by making at least a region of the surface of the base substrate corresponding to the metal bridge uneven, incident light from a side of the base substrate without the metal bridge can be reflected diffusely at least at the region of the base substrate corresponding to the metal bridge, so that the vanishing effect of the metal bridge is enhanced and the visibility of the metal bridge is reduced.

DETAILED DESCRIPTION OF THE IMPLEMENTATIONS

The specific implementations of the present invention will be described in details below in conjunction with the accompany drawings and embodiments. The following embodiments are used for explaining the present invention, rather than limiting the scope of the present invention.

An embodiment of the present invention provides an OGS touch screen, comprising a base substrate and a metal bridge provided on the base substrate, wherein at least a region, which corresponds to the metal bridge, of a surface of the base substrate facing the metal bridge is uneven.

In the OGS touch screen provided by the embodiment of the present invention, by making at least a region of the surface of the base substrate corresponding to the metal bridge uneven, incident light from a side (light-incident side) of the base substrate not having the metal bridge can be reflected diffusely at least at the region of the base substrate corresponding to the metal bridge, so that the vanishing effect of the metal bridge is enhanced and the visibility of the metal bridge is reduced.

For example, the above base substrate may be a glass substrate, and a surface of the base substrate facing the metal bridge may be made uneven by an acid corrosion process Hereinafter, the present invention will be described through more specific implementations in conjunction with FIGS. 1 to 3.

Figure 1:
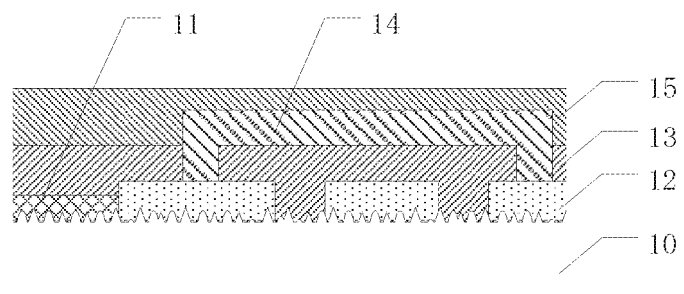
FIG. 1 is a schematic diagram of an OGS touch screen provided by an embodiment of the present invention.

Referring to FIG. 1, FIG. 1 is a schematic diagram of an OGS touch screen provided by an embodiment of the present invention. The OGS touch screen comprises a base substrate 10; and a shading layer 11, a first cover layer (a first OC (over coat) layer) 13, a metal bridge 14, a second cover layer (a second OC layer) 15, and a transparent electrode layer 12 for forming a touch capacitance that are provided on a side of the base substrate 10, wherein, the transparent electrode layer 12, the first cover layer 13, the metal bridge 14 and the second cover layer 15 are sequentially provided on the side of the base substrate 10. The transparent electrode layer 12 may include two types of channels, namely, driving signal channels and sensing signal channels, which cannot be interconnected or interact with one another, and therefore, the metal bridge 14 is required to connect channels of the same type through a bridging structure. The metal bridge 14 may be made of a metal or a metal oxide. The first cover layer 13 isolates the two types of channels of the transparent electrode layer 12 from each other. The first cover layer 13 and the second cover layer 15 may be made of an insulating material such as a transparent insulating organic resin and the like and play a function of isolation and protection. The shading layer 11 may be made of a black photoresist (e.g.BM (black metric)) and is used to form a black frame of the product appearance. In the OGS touch screen of the embodiment, a region, which corresponds to the metal bridge 14, of a surface of the base substrate 10 facing the metal bridge 14 is uneven.

In the embodiment, by making the region of the surface of the base substrate 10 corresponding to the metal bridge 14 uneven, incident light from a side of the base substrate 10 not provided with the metal bridge 14 can be reflected diffusely at the region of the base substrate 10 corresponding to the metal bridge 14, so that the visibility of the metal bridge is effectively reduced. In addition, the contact areas between the transparent electrode layer 12 and the base substrate 10 and between the first cover layer 13 and the base substrate 10 can be effectively increased so as to improve adhesive force of both the transparent electrode layer 12 and the first cover layer 13 to the base substrate 10.

Preferably, in order to reduce process difficulty, the whole surface of the base substrate 10 facing the metal bridge 14 may be made uneven.

In the embodiment, specific patterns of the shading layer 11, the first cover layer (the first OC layer) 13, the metal bridge 14, the second cover layer (the second OC layer) 15 and the transparent electrode layer 12 may be set by a person with ordinary skill in the art according to specific situations, and are not limited by the present invention.

Figure 2:
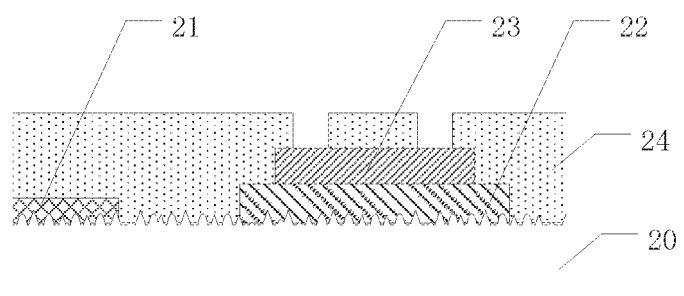
FIG. 2 is a schematic diagram of another OGS touch screen provided by an embodiment of the present invention.
Figure 3:
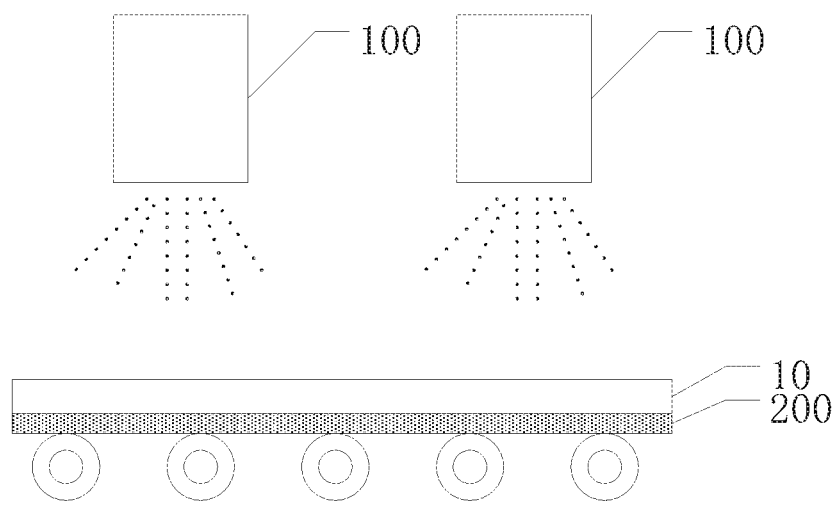
FIG. 3 is schematic diagram of making a preset region of an upper surface of a base substrate uneven according to an embodiment of the present invention.

Referring to FIG. 2, FIG. 2 is a schematic diagram of another OGS touch screen provided by an embodiment of the present invention. The OGS touch screen comprises a base substrate 20; and a shading layer 21, a metal bridge 22, a cover layer (an OC layer) 23, and a transparent electrode layer 24 for forming a touch capacitance that are provided on a side of the base substrate 20, wherein, the metal bridge 22, the cover layer 23 and the transparent electrode layer 24 are sequentially provided on the side of the base substrate 20. The transparent electrode layer 24 may include two types of channels, namely, driving signal channels and sensing signal channels which cannot be interconnected or interact with each other, and therefore, the metal bridge 22 is required to connect channels of the same type through a bridging structure. The metal bridge 22 may be made of a metal or a metal oxide. The cover layer 23 isolates the two types of channels of the transparent electrode layer 24 from each other. The cover layer 23 may be made of an insulating material such as a transparent insulating organic resin or the like and plays the function of isolation and protection. The shading layer 21 may be made of a black photoresist (e.g. BM (black metric)) and is used to form a black frame of the product appearance. In the OGS touch screen of the embodiment, a region, which corresponds to the metal bridge 22, of a surface of the base substrate 20 facing the metal bridge 22 is uneven.

In the embodiment, by making the region on the surface of the base substrate 20 corresponding to the metal bridge 22 uneven, incident light from a side of the base substrate 20 without the metal bridge 22 can be reflected diffusely at the region of the base substrate 20 corresponding to the metal bridge 22, so that the visibility of the metal bridge is effectively reduced. In addition, the contact areas between the metal bridge 22 and the base substrate 20 and between the transparent electrode layer 24 and the base substrate 20 can be effectively increased so as to enhance the adhesive force of both the metal bridge 22 and the transparent electrode layer 24 to the base substrate 20.

Preferably, in order to reduce process difficulty, the whole surface of the base substrate 20 facing the metal bridge 22 may be made uneven.

In the embodiment, specific patterns of the shading layer 21, the metal bridge 22, the cover layer (the OC layer) 23 and the transparent electrode layer 24 may be set by a person with ordinary skill in the art according to specific situations, and are not limited by the present invention.

An embodiment of the present invention further provides a manufacturing method of an OGS touch screen, comprising the following steps S1 and S2.

In step S1, a preset region of an upper surface of a base substrate is made uneven.

For example, the base substrate may be a glass substrate, and the preset region of the upper surface of the base substrate can be made uneven by an acid corrosion process; specifically, a soaking process or a spraying process may be performed on the base substrate using an HF (hydrofluoric acid) solution of a certain concentration, so as to form the required uneven structure in the preset region of the upper surface of the base substrate.

Preferably, to prevent a lower surface of the base substrate from being corroded, before the step of making the preset region of the upper surface of the base substrate uneven by an acid corrosion process, the method may further comprise a step of attaching an anti-acid film onto the lower surface of the base substrate. As shown in FIG. 3, by attaching the anti-acid (Anti-HF) film 200 onto the lower surface (i.e., surface on a light-incident side) of the base substrate 10, the lower surface of the base substrate can be effectively prevented from being corroded by the HF solution when the HF solution is sprayed on the upper surface of the base substrate 10 using a spraying device 100.

In step S2, a metal bridge is formed in the preset region of the upper surface of the base substrate.

For example, a metal film may be formed on the preset region of the upper surface of the base substrate by a sputtering process, and then a patterning process is performed on the metal film, so as to form a metal bridge with a required pattern.

The preset region of the upper surface of the base substrate may be only a region of the upper surface of the base substrate corresponding to the metal bridge, or may be the whole region of the upper surface of the base substrate.

The above manufacturing method can be used to manufacture the OGS touch screens shown in FIGS. 1 and 2.

When the above manufacturing method is used to manufacture the OGS touch screen shown in FIG. 1, in addition to the above steps S1 and S2, the method further comprises steps of forming, on the base substrate, a shading layer, a transparent electrode layer, a first cover layer and a second cover layer. For example, after step S1, firstly, a cleaning and drying process is performed on the acid-corroded base substrate, then the shading layer, the transparent electrode layer (e.g., a transparent conductive material such as ITO), the first cover layer, the metal bridge and the second cover layer are sequentially formed on the base substrate (step S2 included herein), wherein the transparent electrode layer, the first cover layer, the metal bridge and the second cover layer are sequentially formed on one side of the base substrate. The specific forming processes belong to the prior art, and are not described in detail herein.

When the above manufacturing method is used to manufacture the OGS touch screen shown in FIG. 2, in addition to the above steps S1 and S2, the method further comprises steps of forming, on the base substrate, a shading layer, an cover layer and a transparent electrode layer. For example, after step S1, firstly, a cleaning and drying process is performed on the acid-corroded base substrate, then the shading layer, the metal bridge, the cover layer and the transparent electrode layer are sequentially formed (for example, by four yellow light processes) on the base substrate (step S2 included herein), wherein, the metal bridge, the cover layer and the transparent electrode layer are sequentially formed on one side of base substrate. The specific manufacturing processes belong to the prior art, and are not described in detail herein.

In the method of manufacturing an OGS touch screen provided by the embodiment of the present invention, the base substrate is treated by an acid corrosion process so as to form an uneven structure in a preset region of a surface of the base substrate, so that incident light from a side of the base substrate without the metal bridge can be reflected diffusely at least at the region of the base substrate corresponding to the metal bridge, which effectively reduces the visibility of the metal bridge, and further enhances the vanishing effect of the metal bridge. In addition, in the present embodiment, the contact area between the base substrate and each structure provided thereon can be increased so as to enhance the adhesive force of each structure to the base substrate.

An embodiment of the present invention further provides a display device, comprising the above OGS touch screen. The display device provided by the embodiment of the present invention may be any product or component with a display function such as a notebook computer, a display screen, a monitor, a TV, a digital photo frame, a mobile phone, a tablet computer, or the like.

The foregoing implementations are merely used for describing the present invention, rather than limiting the present invention. A person of ordinary skill in the art may make various variations and modifications without departing from the spirit and scope of the present invention, and all technical solutions and equivalence thereof shall fall into the scope of the present invention. The protection scope of the present invention shall be defined by the appended claims.

What is claimed is:

1. A method of manufacturing an OGS touch screen, comprising steps of:
    making a preset region of an upper surface of a base substrate uneven; and
    forming a metal bridge on the preset region of the upper surface of the base substrate,
    wherein the base substrate is a glass substrate, and the step of making the preset region of the upper surface of a base substrate uneven includes: making the preset region of the upper surface of the base substrate uneven by an acid corrosion process,
    wherein the method further comprises before the step of making the preset region of the upper surface of the base substrate uneven by an acid corrosion process, a step of attaching an anti-acid film onto a lower surface of the base substrate.

2. The method of manufacturing an OGS touch screen according to claim 1, further comprising steps of forming a shading layer, a transparent electrode layer, a first cover layer and a second cover layer on the base substrate, wherein the transparent electrode layer, the first cover layer, the metal bridge and the second cover layer are sequentially formed on a side of the base substrate.

3. The method of manufacturing an OGS touch screen according to claim 1, further comprising steps of forming a shading layer, a cover layer and a transparent electrode layer on the base substrate, wherein the metal bridge, the cover layer and the transparent electrode layer are sequentially formed on a side of the base substrate.

4. The method of manufacturing an OGS touch screen according to claim 1, wherein the preset region of the upper surface of the base substrate is a region of the upper surface of the base substrate corresponding to the metal bridge only.

* * * * *